(12) United States Patent
Masuda et al.

(10) Patent No.: US 10,078,027 B2
(45) Date of Patent: *Sep. 18, 2018

(54) PRESSURE SENSING ELEMENT INCLUDING ELECTRODE HAVING PROTRUSION

(71) Applicant: Panasonic Intellectual Property Management Co., Ltd., Osaka (JP)

(72) Inventors: Shinobu Masuda, Osaka (JP); Keiji Noine, Osaka (JP); Tetsuyoshi Ogura, Osaka (JP); Kenichi Ezaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 275 days.

This patent is subject to a terminal disclaimer.

(21) Appl. No.: 15/063,690

(22) Filed: Mar. 8, 2016

(65) Prior Publication Data

US 2016/0273987 A1    Sep. 22, 2016

(30) Foreign Application Priority Data

Mar. 19, 2015  (JP) ................................. 2015-056282

(51) Int. Cl.
*G01L 9/00*    (2006.01)

(52) U.S. Cl.
CPC ................... *G01L 9/0073* (2013.01)

(58) Field of Classification Search
CPC ... G01L 9/0072; G01L 9/0073; G01L 9/0075; G01L 9/0005
USPC ................. 73/718, 724; 361/283.1
See application file for complete search history.

(56) References Cited

U.S. PATENT DOCUMENTS

| | | | | |
|---|---|---|---|---|
| 4,827,763 A | * | 5/1989 | Bourland | A61B 5/113 361/283.1 |
| 4,852,443 A | * | 8/1989 | Duncan | G10H 1/0551 200/600 |
| 7,719,007 B2 | * | 5/2010 | Tompkins | G01L 1/142 257/48 |
| 9,752,940 B2 | * | 9/2017 | Ogura | G01L 1/142 |
| 2012/0160657 A1 | | 6/2012 | Mizushima | |

FOREIGN PATENT DOCUMENTS

| | | |
|---|---|---|
| JP | 1-092632 | 4/1989 |
| JP | 9-043081 | 2/1997 |
| JP | 2007-315875 | 12/2007 |

(Continued)

*Primary Examiner* — John Fitzgerald
*Assistant Examiner* — Truong D Phan
(74) *Attorney, Agent, or Firm* — McDermott Will & Emery LLP

(57) ABSTRACT

A pressure sensing element according to one aspect of the present disclosure includes a first electrode including at least one protrusion, a second electrode facing the at least one protrusion, and a dielectric disposed between the first electrode and the second electrode. The dielectric includes a first dielectric and a second dielectric. The first dielectric is disposed between a top of the at least one protrusion and the second electrode, and is in contact with each of the top of the at least one protrusion and the second electrode. The second dielectric is disposed between a first portion of the first electrode and the first dielectric. The first portion does not include the at least one protrusion. The at least one protrusion has a higher elastic modulus than the first dielectric.

12 Claims, 14 Drawing Sheets

(56) References Cited

FOREIGN PATENT DOCUMENTS

| JP | 2011-159599 | 8/2011 |
| JP | 2012-026906 | 2/2012 |
| JP | 2014-142193 | 8/2014 |

* cited by examiner

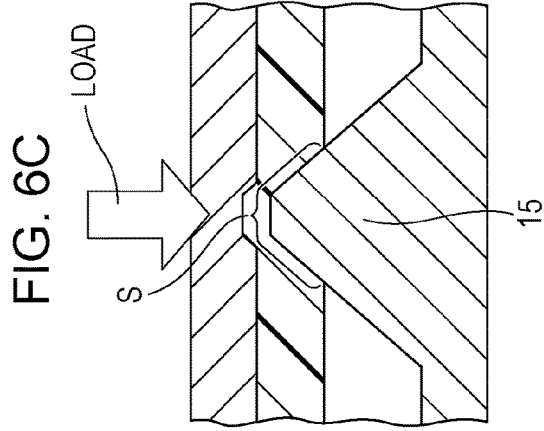
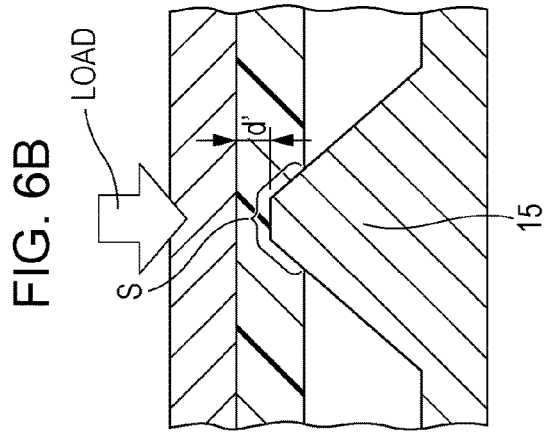
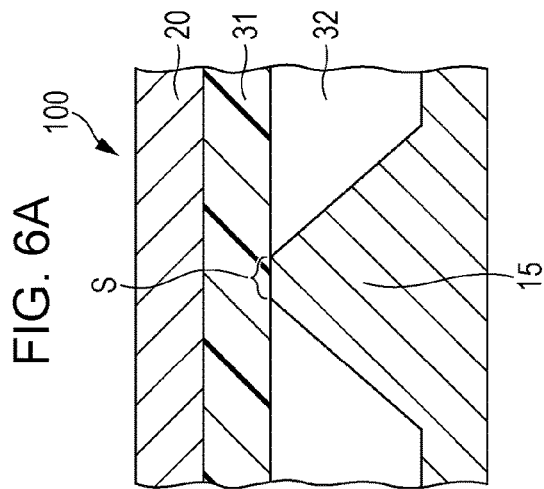
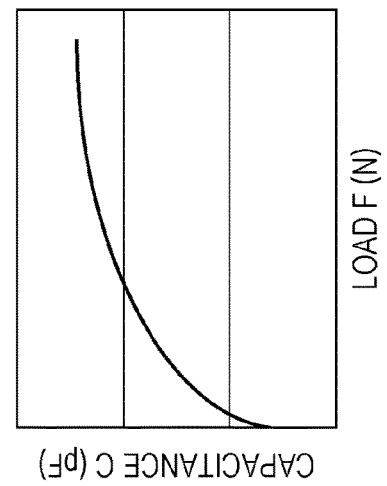

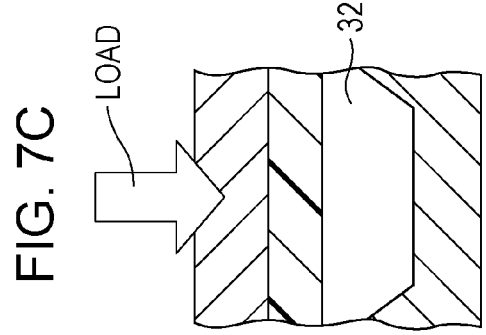
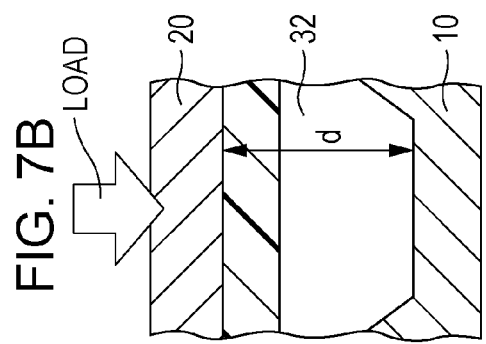
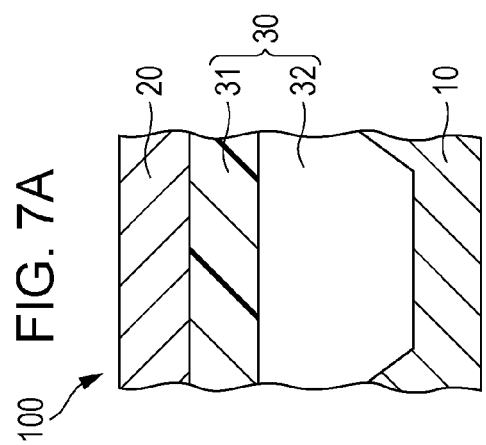
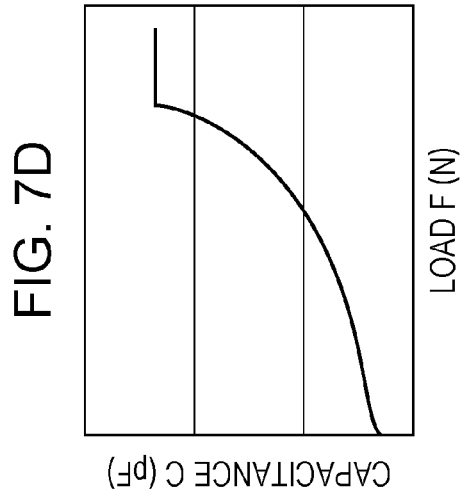

PRESSURE SENSING ELEMENT INCLUDING ELECTRODE HAVING PROTRUSION

BACKGROUND

1. Technical Field

The present disclosure relates to a pressure sensing element, more particularly to a pressure sensing element applicable to various electrical devices.

2. Description of the Related Art

Electrical devices having a high performance and a wide variety of functions, such as smartphones and car navigation systems, are being developed. This requires a pressure sensing element, which is a component of the electrical device, to have reliable operation performance. The pressure sensing element is formed of a conductive elastic material, for example, and is a sensor that performs detection upon application of an external load. The pressure sensing element is used as a sensor element in various electrical devices. Japanese Unexamined Patent Application Publication Nos. 1-92632, 2014-142193, and 2011-159599, for example, disclose a technique relating to such a pressure sensing element.

SUMMARY

In one general aspect, the techniques disclosed here feature a pressure sensing element including a first electrode including at least one protrusion, a second electrode facing the at least one protrusion, and a dielectric disposed between the first electrode and the second electrode. The dielectric includes a first dielectric and a second dielectric. The first dielectric is disposed between a top of the at least one protrusion and the second electrode, and is in contact with each of the top of the at least one protrusion and the second electrode. The second dielectric is disposed between a first portion of the first electrode and the first dielectric. The first portion does not include the at least one protrusion. The at least one protrusion has a higher elastic modulus than the first dielectric.

A pressure sensing element according to the present disclosure has a relatively long service life.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a cross-sectional view schematically illustrating a first capacitor of a pressure sensing element according to a second embodiment of the present disclosure;

FIG. 6B is a cross-sectional view schematically illustrating a state of the first capacitor during application of a load to the pressure sensing element according to the second embodiment;

FIG. 6C is a cross-sectional view schematically illustrating a state of the first capacitor during application of a higher load to the pressure sensing element according to the second embodiment;

FIG. 6D is a diagram schematically indicating a capacitance change characteristic of the first capacitor during application of pressure in the pressure sensing element according to the second embodiment;

FIG. 7A is a cross-sectional view schematically illustrating a second capacitor of the pressure sensing element according to the second embodiment;

FIG. 7B is a cross-sectional view schematically illustrating a state of the second capacitor during application of a load to the pressure sensing element according to the second embodiment;

FIG. 7C is a cross-sectional view schematically illustrating a state of the second capacitor during application of a higher load to the pressure sensing element according to the second embodiment;

FIG. 7D is a diagram schematically indicating a capacitance change characteristic of the second capacitor during application of pressure in the pressure sensing element according to the second embodiment;

DETAILED DESCRIPTION

Figure 1:
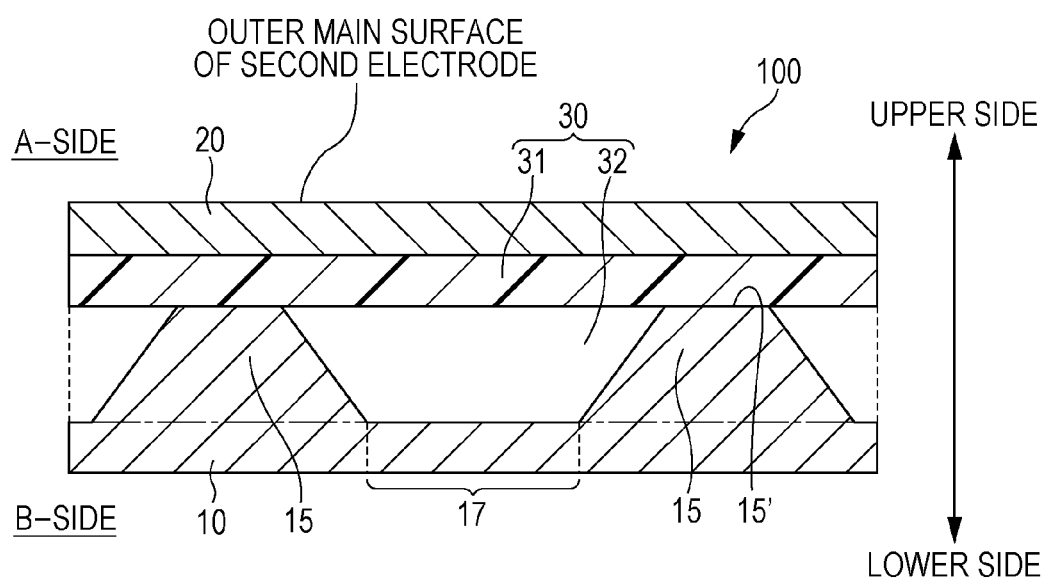
FIG. 1 is a cross-sectional view schematically illustrating a configuration of a pressure sensing element of the present disclosure.

Inventors of the present disclosure conducted a comprehensive study and recognized a need for improving the service life of pressure sensing elements used as capacitance-type pressure sensors. In conventional pressure sensing elements, the contact area between an elastic electrode and a dielectric layer increases when the elastic electrode is deformed by a load. This causes a change in the capacitance of the pressure sensing element, enabling detection of the load. In the conventional pressure sensing elements, material fatigue is caused by stress concentrated on the elastic electrode, leading to a problem of a shorter service life.

The inventors of the present disclosure also recognized a need for improving the control of linearity in the conventional pressure sensing elements. The capacitance of the conventional pressure sensing element increases only according to an increase in the contact area. However, the load necessary for the deformation of the elastic electrode increases according to an increase in a deformation amount of the elastic electrode and the increase in the contact area, i.e., two parameters. Thus, the change in the capacitance is large in a low-load application section and is small in a high-load application section, which requires the pressure sensing element to have a complex structure (such as a structure including a protruding elastic electrode having a complex shape, for example) in order to control the linearity.

A pressure sensing element according to one aspect of the present disclosure has a simple structure, high linearity, and a long service life. The aspect of the present disclosure is briefly described below.

First Feature

A pressure sensing element according to one aspect of the present disclosure includes a first electrode including at least one protrusion, a second electrode facing the at least one protrusion, and a dielectric disposed between the first electrode and the second electrode. The dielectric includes a first dielectric and a second dielectric. The first dielectric is disposed between a top of the at least one protrusion and the second electrode, and is in contact with each of the top of the at least one protrusion and the second electrode. The second dielectric is disposed between a first portion of the first electrode and the first dielectric. The first portion does not include the at least one protrusion. The at least one protrusion has a higher elastic modulus than the first dielectric.

Second Feature

In the pressure sensing element according to the first feature, the first dielectric may have flexibility.

Third Feature

In the pressure sensing element according to the first feature, the second dielectric may be configured such that a thickness of the second dielectric decreases when the first dielectric is flexurally deformed by a load applied to the pressure sensing element.

Fourth Feature

In the pressure sensing element according to the first feature, the first dielectric may have elasticity.

Fifth Feature

In the pressure sensing element according to the first feature, the first dielectric may be configured to allow at least one portion of the at least one protrusion to penetrate into the first dielectric and configured to such that a contact area between the at least one protrusion and the first dielectric increases due to the penetration when a load is applied to the pressure sensing element.

Sixth Feature

In the pressure sensing element according to the fifth feature, the second dielectric may be configured such that a thickness of the second dielectric decreases when the at least one portion of the at least one protrusion penetrates into the first dielectric due to the application of the load to the pressure sensing element.

Seventh Feature

In the pressure sensing element according to any one of the first to sixth features, the pressure sensing element may have a capacitance including a first capacitance and a second capacitance. The first capacitance is a capacitance of a first capacitor including a contact area between the at least one protrusion and the first dielectric. The second capacitance is a capacitance of a second capacitor including a contact area between the first dielectric and the second dielectric.

Eighth Feature

In the pressure sensing element according to the seventh feature, a capacitance characteristic of the pressure sensing element may have a higher linearity than that of the first capacitance and that of the second capacitance.

Ninth Feature

In the pressure sensing element according to the seventh feature or the eight feature, the first capacitor may include the at least one protrusion, a first portion of the second electrode facing the at least one protrusion, and a first portion of the first dielectric positioned between the at least one protrusion and the first portion of the second electrode. The second capacitor may include the first portion of the first electrode, a second portion of the second electrode facing the first portion of the first electrode, a second portion of the first dielectric positioned between the first portion of the first electrode and the second portion of the second electrode, and the second dielectric.

Tenth Feature

In the pressure sensing element according to any one of the first to ninth features, the at least one protrusion may have a tapered shape in which a width of the at least one protrusion gradually decreases toward the second electrode.

Eleventh Feature

In the pressure sensing element according to any one of the first to tenth features, at least one selected from the group of the first electrode, the second electrode, the first dielectric, and the second dielectric has light transmissivity.

Twelfth Feature

The pressure sensing element according to any one of the first to eleventh features may further include a supporting member and a pressing member. The first electrode has a first main surface facing the second electrode and a second main surface opposite the first main surface. The second electrode has a third main surface facing the first electrode and a fourth main surface opposite the third main surface. The supporting member is in contact with the second main surface. The pressing member is in contact with the fourth main surface.

Thirteenth Feature

The pressure sensing element according to any one of the first to twelfth features may further include a spacer disposed between the first electrode and the second electrode.

Pressure Sensing Element of Present Disclosure

The pressure sensing element of the present disclosure is an element having a capacitance and functions as a capacitor. A change in the capacitance of the pressure sensing element is caused when a load is applied thereto. The change in the capacitance enables the load to be detected. Thus, the pressure sensing element of the present disclosure may be referred to as a capacitance-type pressure sensing element, a capacitive pressure sensor element, or a pressure sensing switch element.

Hereinafter, an embodiment of a pressure sensing element of the present disclosure is described with reference to the drawings. Components in the drawings are schematically illustrated only for ease of understanding of the present disclosure and the dimensional ratio and appearance of the components in the drawings may be different from those of actual components. A vertical direction referred to directly or indirectly herein corresponds to a vertical direction in the drawings. In addition, the same reference numerals or the same symbols are used to indicate components or meanings identical to each other except for the shape unless otherwise specified.

FIG. 1 schematically illustrates a configuration of a pressure sensing element 100 of the present disclosure. The pressure sensing element 100 includes a first electrode 10, a second electrode 20, and a dielectric 30.

The first electrode 10 includes at least one protrusion 15. The second electrode 20 may be a layered electrode. The second electrode 20 and the first electrode 10 face each other. Specifically, the second electrode 20 faces the first electrode 10 such that the protrusion 15 is sandwiched between the second electrode 20 and the first electrode 10. The whole of the dielectric 30 is disposed between the first electrode 10 and the second electrode 20.

The dielectric 30 of the pressure sensing element 100 includes two dielectrics including a first dielectric 31 and a second dielectric 32. As illustrated in FIG. 1, the first dielectric 31 and the second dielectric 32 are adjacent to each other (i.e., the first dielectric 31 and the second dielectric 32 overlap and are in contact with each other). In particular, the first dielectric 31 and the second dielectric 32 are adjacent to each other or overlap in a facing direction of the first electrode 10 and the second electrode 20 (vertical direction in FIG. 1). The first dielectric 31 is in contact with each of a top 15' of the protrusion 15 of the first electrode 10 and the second electrode 20 so as to be positioned therebetween. In other words, the first dielectric 31 is sandwiched between the top 15' of the protrusion 15 and the second electrode 20. The second dielectric 32 is positioned in a concave portion of the first electrode 10 defined by the protrusions 15. The second dielectric 32 is positioned between the protrusions 15 adjacent to each other. In other words, the second dielectric 32 is positioned in a space defined by an upper surface of a protrusion-free portion 17 of the first electrode 10, which does not include the protrusions 15, and side surfaces of the protrusions 15 as illustrated in FIG. 1.

Hereinafter, each component is described in detail. The first electrode 10 is an electrode including the at least one protrusion 15. The protrusion 15 has stiffness (resistance to deformation caused by external force). The first electrode 10 may be referred to as a stiff electrode. The first electrode 10 may be formed of any material that provides both stiffness (particularly to the protrusion 15) and a conductive property. To have stiffness, the first electrode 10, particularly the protrusion 15, has an elastic modulus of about $10^6$ Pa or more, in particular, an elastic modulus of more than $10^6$ Pa and less than $10^9$ Pa (for example, about $10^7$ Pa). The first electrode 10 having the elastic modulus in the above-described range is unlikely to be deformed by a normal pressing force applied to the pressure sensing element (for example, pressing force of about 1 N to 10 N). To have the conductive property, the first electrode 10, in particular, the protrusion 15, has a resistance that is sufficiently lower than the impedance of the capacitance in a predetermined frequency band.

The first electrode 10 may be a metal body, a glass body having a conductive layer thereon and/or a conductive filler dispersed therein, or a resin body having a conductive layer thereon and/or a conductive filler dispersed therein. Since the metal body is a metal electrode formed of metal, the first electrode 10 may be formed of metal. The metal body may include at least one metal selected from the group consisting of gold (Au), silver (Ag), copper (Cu), carbon (C), zinc oxide (ZnO), indium (III) oxide ($In_2O_3$), and tin (IV) oxide ($SnO_2$), for example. Any glass body having a network structure of silicon oxide is used as the glass body. The glass body may include at least one glass material selected from the group consisting of quartz glass, soda-lime glass, borosilicate glass, and lead glass, for example. The resin body may include at least one resin material selected from the group consisting of a styrenic resin, a silicone resin (such as dimethylpolysiloxane (PDMS)), an acrylic resin, a rotaxane resin, and a urethane resin, for example. The conductive layer of the glass body or the resin body may be formed by depositing at least one metal selected from the group of metals listed as the material of the metal body. Alternatively, the conductive layer may be formed by applying a conductive ink, for example. The conductive filler of the glass body or the resin body may include at least one metal selected from the above-described group of metals listed as the material of the metal body.

The first electrode 10 formed of the metal body or the glass body having the conductive layer and/or the conductive filler, for example, generally has the elastic modulus in the above-described range. The elastic modulus of the first electrode 10 formed of the resin body having the conductive layer and/or the conductive filler is adjusted by changing a degree of polymerization of the resin material of the resin body, a chemical structure, or a proportion of the resin material to the conductive filler. The first electrode 10 formed of any one of the metal body, the glass body having the conductive layer, and the resin body having the conductive layer generally has a resistance sufficiently lower than the impedance of the capacitance in a predetermined frequency band. The resistance of the first electrode 10 formed of the glass body having the conductive filler or the resin body having the conductive filler is adjusted by changing the proportion of the glass material of the glass body or the resin material of the resin body to the conductive filler.

As illustrated in the drawings (FIG. 1, for example), the protrusion 15 protrudes from a base of the first electrode 10 toward the second electrode 20. In other words, the first electrode 10 has local protrusions extending from the base toward the second electrode 20. The first electrode 10 includes at least one protrusion 15. The pressure sensing element 100 as a whole may include two or more protrusions 15, and one first electrode 10 may have a plurality of protrusions 15. The first electrode 10 has a concave-convex shape on the whole due to the plurality of protrusions 15. Convex portions of the concave-convex shape correspond to the protrusions 15.

The protrusion 15 may have any shape that defines the second dielectric 32 on the first electrode 10 in combination with another protrusion 15. The protrusion 15 may have a truncated pyramidal shape such as a circular truncated conical shape as illustrated in FIG. 1 or a four-sided truncated pyramidal shape, a columnar shape such as a cylindrical shape or a quadrangular prismatic shape. Alternatively, the protrusion 15 may have a semispherical shape. The protrusion 15 may have a tapered shape in order to give the pressure sensing element 100 a longer service life. Specifically, the protrusion 15 of the first electrode 10 may be tapered such that the width gradually decreases toward the second electrode 20 (FIG. 1). The truncated pyramidal shape and the semispherical shape, which are described above, are examples of such a tapered shape.

The height of the protrusion 15 may be any value that allows the first dielectric 31, which is described later, to be elastically deformed or flexurally deformed. In other words, the height may be any value that allows the first dielectric 31 to be elastically deformed or flexurally deformed by pressure applied from a side of the first dielectric 31 adjacent to the second electrode 20. The protrusions 15 may be regularly arranged. The adjacent protrusions 15 may be separated from each other by any distance that allows the first dielectric 31 to be elastically deformed or flexurally deformed and allows a concave portion (space for the second dielectric 32) to be reliably provided between adjacent protrusions 15.

The first dielectric 31 is disposed between the top 15' of the protrusion 15 of the first electrode 10 and the second electrode 20 so as to be in contact with each of them. In other words, the first dielectric 31 is sandwiched between the top 15' (top surface, for example) of the protrusion 15 and the second electrode 20. The first dielectric 31 may be a layered dielectric.

The first dielectric 31 has properties of the dielectric and deformability. The term "deformability" used in the description of the first dielectric 31 and the second electrode 20, which is described later, refers to a property including elasticity (ability to deform so as to have a local dent upon application of external force and to return to the original shape upon release of the external force) and flexibility (ability to flexurally deform upon application of external force and to return to the original shape upon release of the external force). The first dielectric 31 may have one of the properties of elasticity and flexibility.

The first dielectric 31 having elasticity may be referred to as an elastic dielectric or an elastic dielectric layer. The first dielectric 31, which is the elastic dielectric or the elastic dielectric layer, is elastically deformed by a portion of the protrusion 15 of the first electrode 10 that penetrates into the first dielectric 31 upon application of pressure to the pressure sensing element 100. The deformation of the first dielectric 31 allows the second dielectric 32 to deform so as to become thinner (see, Second Embodiment, which is described later).

The first dielectric 31 having the elasticity may have a lower elastic modulus than the first electrode 10 (particularly, the protrusion 15) so as to be more deformed than the first electrode 10 (particularly, the protrusion 15) by application of pressure. If the elastic modulus of the first electrode 10 (particularly, the protrusion 15) is about $10^6$ Pa or more, the first dielectric 31 may have an elastic modulus of about $10^4$ Pa to $10^6$ Pa, for example, which is smaller than the elastic modulus of the first electrode 10. The first dielectric 31 may have any thickness that allows the first dielectric 31 to be elastically deformed by the portion of the protrusion 15 that penetrates into the first dielectric 31 to such a degree that the deformed first dielectric 31 causes an increase in the area of the contact area between the protrusion 15 and the first dielectric 31 and a decrease in thickness of the second dielectric 32.

The first dielectric 31 having flexibility may be referred to as a flexible dielectric or a flexible dielectric layer. The first dielectric 31, which is the flexible dielectric or the flexible dielectric layer, is flexurally deformed at a position between the protrusions 15 of the first electrode 10 upon application of pressure to the pressure sensing element 100. The deformation of the first dielectric 31 allows the second dielectric 32 to deform so as to become thinner (see, First Embodiment, which is described later).

The first dielectric 31 having flexibility typically has an elastic modulus of about $10^7$ Pa or more. In this case, the first dielectric 31 may have any thickness that allows the first dielectric 31 to be flexurally deformed to such a degree that the deformed first dielectric 31 causes a decrease in thickness of the second dielectric 32. Since the first dielectric 31 that is thin like a film is readily flexurally deformed, the thickness may be in the range of 1 to 100 μm.

The first dielectric 31 may be formed of any material that at least provides properties of the dielectric and deformability. The first dielectric 31 may be formed of a material including a resin, a ceramic, an oxidized metal, or any combination thereof, for example. The material of the first dielectric 31 may include at least one material selected from the group consisting of a polypropylene resin, a polyethylene terephthalate resin, a polyimide resin, a polyphenylene sulfide resin, aluminum oxide ($Al_2O_3$), and tantalum pentoxide ($Ta_2O_5$), for example. The elastic modulus is adjusted by changing a proportion of the ceramic and/or the oxidized metal to the resin component. The first dielectric 31 may include a material having a resistance higher than the impedance of the capacitance in a predetermined frequency band. The material (dielectric constant) and the thickness of the first dielectric 31 are selected and determined such that the first dielectric 31 has a dielectric constant and a thickness that allow the first dielectric 31 to have a capacitance per unit area larger than that of the second dielectric 32 before deformation.

The second dielectric 32 is positioned in the concave portion of the first electrode 10, which is defined by the protrusions 15. In other words, the second dielectric 32 is positioned between the adjacent protrusions 15. In other words, as illustrated in FIG. 1, the second dielectric 32 is positioned in a space defined by the upper surface of the protrusion-free portion 17 of the first electrode 10, which does not include the protrusions 15, and the side surfaces of the protrusions 15. The upper surface of the second dielectric 32 may be flush with the tops 15' (top surface of the protrusions 15) of the protrusions 15 as illustrated in FIG. 1.

The second dielectric 32 may be formed of any dielectric material that does not prevent the deformation of the first dielectric 31. The second dielectric 32 may be an air-filled portion, for example. Such a configuration allows the first dielectric 31 to be reliably deformed upon application of pressure to the pressure sensing element 100, enabling the second dielectric 32 to deform so as to become thinner.

The second electrode 20 is an electrode facing the first electrode 10. The second electrode 20 may be a layered electrode. The second electrode 20 may be formed of any material that provides a conductive property. The material of the second electrode 20 may be the same as the material of an electrode layer of a common pressure sensing element or a common sensor element, for example.

The second electrode 20 may have deformability. As in the description of the first dielectric 31, the term "deformability" used in the description of the second electrode 20 refers to a property including elasticity (ability to deform so as to have a local dent upon application of external force and to return to the original shape upon release of the external force) and flexibility (ability to flexurally deform upon application of external force and to return to the original shape upon release of the external force). The second electrode 20 may have one of the properties of elasticity and flexibility.

The second electrode 20 having elasticity may be referred to as an elastic electrode or an elastic electrode layer. The second electrode 20, which is the elastic electrode or the elastic electrode layer, and the first dielectric 31, which is the elastic dielectric or the elastic dielectric layer, are further elastically deformed by a portion of the protrusion 15 of the first electrode 10 that penetrates into the first dielectric 31 upon application of pressure to the pressure sensing element 100. The elastic deformation of the first dielectric 31 and the second electrode 20 allows the second dielectric 32 to deform so as to become thinner (see, Second Embodiment, which is described later).

The second electrode 20 having elasticity may have a lower elastic modulus than the first electrode 10 (particularly, the protrusion 15) so as to deform largely compared with the first electrode 10 (particularly, the protrusion 15) upon application of pressure. If the elastic modulus of the first electrode 10 (particularly, the protrusion 15) is about $10^7$ Pa or more, the second electrode 20 may have an elastic modulus of about $10^4$ Pa to $10^7$ Pa, for example, which is smaller than the elastic modulus of the first electrode 10. In this case, the second electrode 20 may have any thickness that allows the second electrode 20 to be elastically deformed to such a degree that the deformed second electrode 20 causes an increase in the area of the contact area between the protrusion 15 and the first dielectric 31 and a decrease in the thickness of the second dielectric 32.

The second electrode 20 having flexibility may be referred to as a flexible electrode or a flexible electrode layer. The second electrode 20, which is the flexible electrode or the flexible electrode layer, and the first dielectric 31, which is the flexible dielectric or the flexible dielectric layer, allow the first dielectric 31 to flexurally deform further reliably at a position between the protrusions 15 of the first electrode 10 upon application of pressure to the pressure sensing element 100. The flexural deformation of the first dielectric 31 allows the second dielectric 32 to deform so as to become thinner (see, First Embodiment, which is described later).

The second electrode 20 having the flexibility typically has an elastic modulus of about $10^7$ Pa or more. In this case, the second electrode 20 may have any thickness that allows the second electrode 20 to be elastically deformed to such a degree that the deformed second electrode 20 causes a decrease in the thickness of the second dielectric 32.

The second electrode 20 having the deformability may be formed of any material that at least provides deformability and conductivity to the second electrode 20. The second electrode 20 may be formed of the resin body having the conductive layer thereon and/or the conductive filler dispersed therein as the first electrode 10. The elastic modulus is adjusted by changing a degree of polymerization of the polymer as the resin component of the resin body and the ratio of the conductive filler to the resin component of the resin body.

In one embodiment of the pressure sensing element 100 of the present disclosure, a pressing side of the pressure sensing element 100 is adjacent to an outer main surface of the second electrode 20, which faces the first electrode 10. As indicated in FIG. 1, an A side (upper side in FIG. 1) of the pressure sensing element 100, which is opposite a B side (lower side in FIG. 1), is the pressing side. In this embodiment, pressure is applied to the pressure sensing element 100 from the side adjacent to the outer main surface of the second electrode 20 toward an inner surface thereof. In other words, the pressure is applied to the pressure sensing element 100 from the A side toward the B side.

The pressure sensing element 100 of the present disclosure may be embodied in various ways. Hereinafter, various embodiments of the pressure sensing element 100 are described.

First Embodiment

Figure 2A:
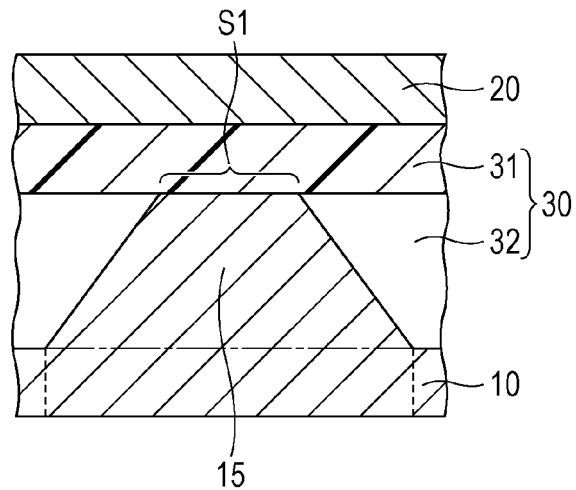
FIG. 2A to FIG. 2C are cross-sectional views schematically illustrating how a state of a portion around a protrusion changes with the passage of time during application of a load to a pressure sensing element according to one aspect of a first embodiment of the present disclosure.
Figure 2B:
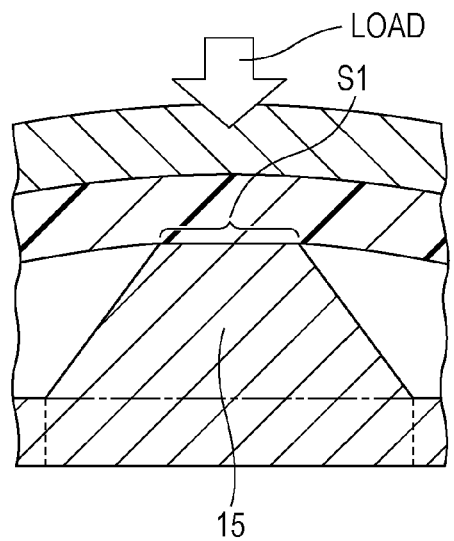
Figure 2C:
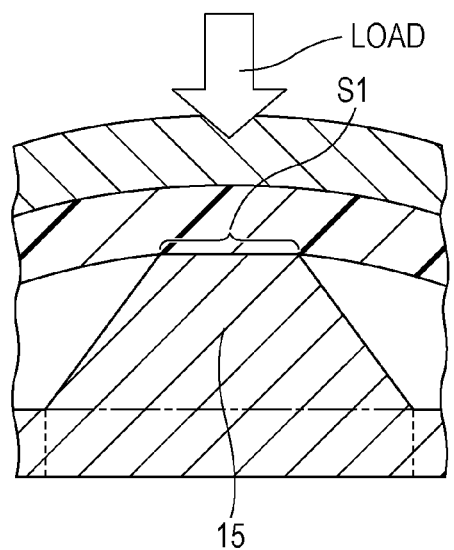
Figure 3A:
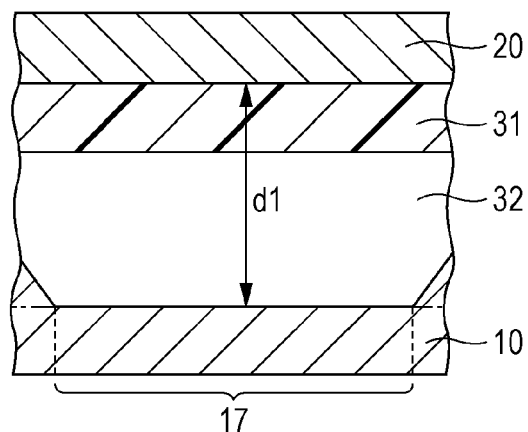
FIG. 3A to 3C are cross-sectional views schematically illustrating how a state of a portion around a second dielectric changes with the passage of time during application of a load to the pressure sensing element according to the aspect of the first embodiment.
Figure 3B:
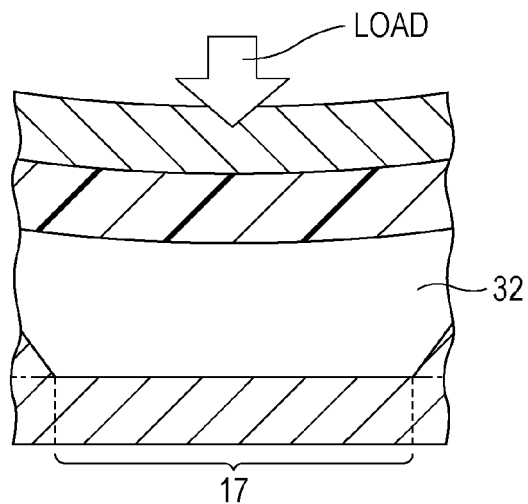
Figure 3C:
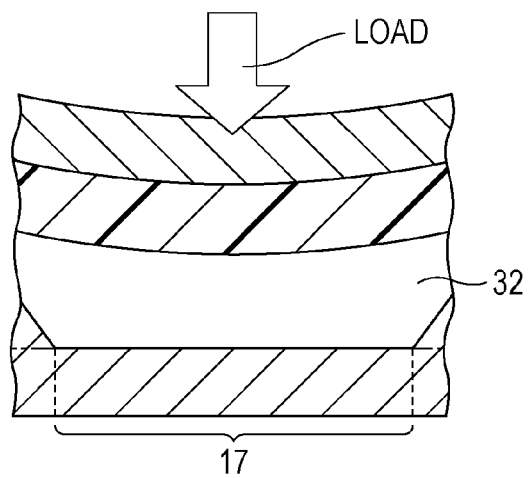

In this embodiment, the first dielectric 31 and the second electrode 20 of the above-described pressure sensing element 100 have flexibility. As illustrated in FIG. 2A to FIG. 2C, for example, when a load is applied to the pressure sensing element 100, an area S1 of the contact area between the protrusion 15 (particularly, the top 15' thereof) and the first dielectric 31 does not change. However, as illustrated in FIG. 3A to FIG. 3C, the first dielectric 31 and the second electrode 20 are flexurally deformed. This causes deformation of the second dielectric 32, resulting in a decrease in a thickness d1 of the dielectric 30 (particularly, the thickness of the second dielectric 32). The decrease in the thickness d1 causes a change in the capacitance of the pressure sensing element 100, enabling detection of the load. Specifically, the change in capacitance detected in this embodiment occurs in the same way as the change in a second capacitance of a second capacitor of a pressure sensing element according to a second embodiment, which is described later. FIG. 2A to FIG. 2C are cross-sectional views schematically illustrating how a state of a portion around the protrusion 15 changes with the passage of time during application of a load to the pressure sensing element 100 according to one aspect of a first embodiment of the present disclosure. FIG. 3A to FIG. 3C are cross-sectional views schematically illustrating how a state of a portion around the second dielectric 32 changes with the passage of time during application of a load to the pressure sensing element 100 illustrated in FIG. 2A to FIG. 2C.

In FIG. 2A to FIG. 2C, the protrusion 15 has a truncated pyramidal shape, but may have a cylindrical shape or a semispherical shape. The protrusion 15 preferably has a truncated pyramidal shape or a semispherical shape in order to give the pressure sensing element 100 a longer service life.

Figure 4A:
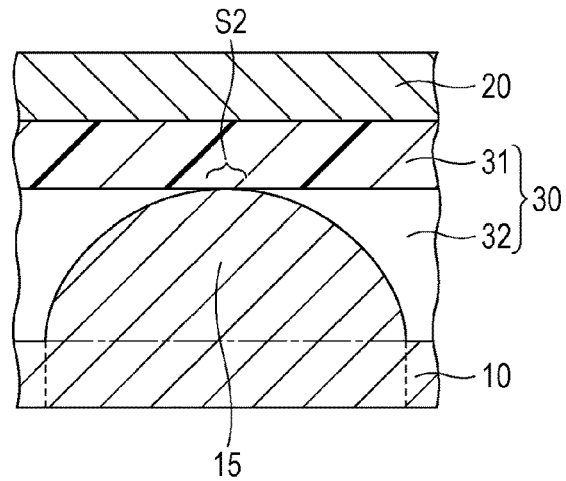
FIG. 4A to FIG. 4C are cross-sectional views schematically illustrating how a state of a portion around a protrusion changes with the passage of time during application of a load to a pressure sensing element according to another aspect of the first embodiment.
Figure 4B:
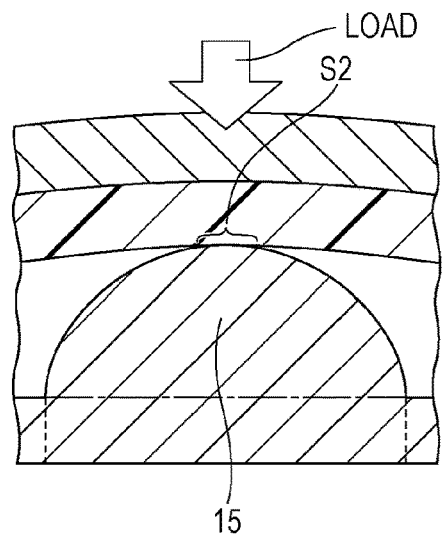
Figure 4C:
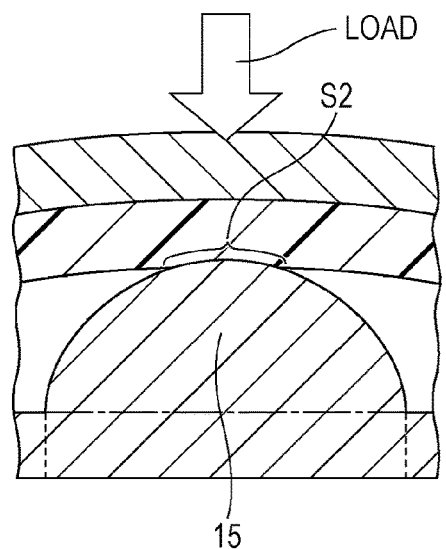
Figure 5A:
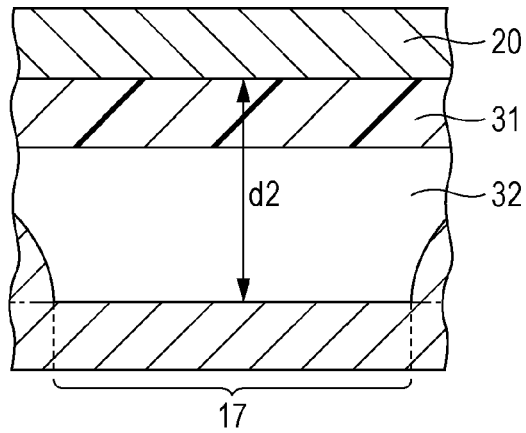
FIG. 5A to FIG. 5C are cross-sectional views schematically illustrating how a state of a portion around a second dielectric changes with the passage of time during application of a load to a pressure sensing element according to the other aspect of the first embodiment.
Figure 5B:
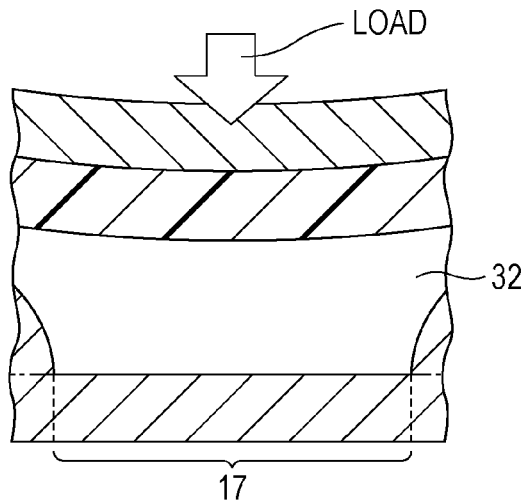
Figure 5C:
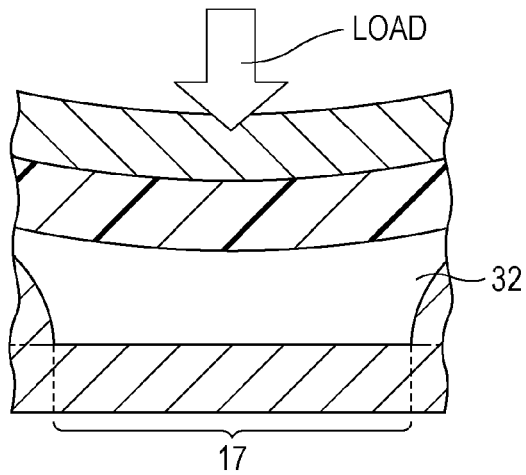

In this embodiment, if the protrusion 15 has a semispherical shape, the linearity in the capacitance change characteristic (capacitance change characteristic during application of load) is improved as in the second embodiment, which is described later. Specifically, as illustrated in FIG. 4A to FIG. 4C, for example, when a load is applied to the pressure sensing element 100, an area S2 of the contact area between the protrusion 15 (particularly, the top 15' thereof) and the first dielectric 31 increases due to flux deformation of the first dielectric 31 and the second electrode 20. In addition, as illustrated in FIG. 5A to FIG. 5C, the second dielectric 32 deforms and the thickness d2 of the dielectric 30 (particularly, thickness of the second dielectric 32) decreases. The increase in the area S2 causes a change in capacitance. The change in capacitance is larger during low-load application than during high-load application. The decrease in the thickness d2 causes a change in capacitance. The change in capacitance is larger during high-load application than during low-load application. Since two kinds of capacitance change characteristics are used in combination as described above, the linearity of the capacitance change characteristic (capacitance change characteristic during application of load) is improved. Specifically, the change in the capacitance due to the increase in the area S2 occurs in the same way as a change in a first capacitance of a first capacitor of the pressure sensing element 100 according to the second embodiment, which is described later. The change in the capacitance due to the decrease in the thickness d2 occurs in the same manner as a change in a second capacitance of a second capacitor of the pressure sensing element 100 according to the second embodiment, which is described later. FIG. 4A to FIG. 4C are cross-sectional views schematically illustrating how a state of a portion around the protrusion 15 changes with the passage of time during application of a load to the pressure sensing element 100 according to another aspect of the first embodiment of the present disclosure. FIG. 5A to FIG. 5C are cross-sectional views schematically illustrating how a state of a portion around the second dielectric 32 changes with the passage of time during application of a load to the pressure sensing element 100 illustrated in FIG. 4A to FIG. 4C.

A method of detecting the change in capacitance, a method of deriving the load from the change in capacitance, and a controller used together with the pressure sensing element, which are described in the following second embodiment, are applicable to the first embodiment.

Second Embodiment

In this embodiment, at least the first dielectric 31 of the above-described pressure sensing element 100 has elasticity. As illustrated in FIG. 6B, when a load is applied to the pressure sensing element 100, the first dielectric 31 is electrically deformed by a portion of the protrusion 15 that penetrates into the first dielectric 31, resulting in an increase in an area S of the contact area between the protrusion 15 (particularly, the top 15' thereof) and the first dielectric 31. The increase in the area S causes a change in the capacitance. As illustrated in FIG. 7B and FIG. 7C, the elastic deformation of the first dielectric 31 causes deformation of the second dielectric 32, resulting in a decrease in thickness d of the dielectric 30 (particularly, thickness of the second dielectric 32). The decrease in the thickness d causes a change in the capacitance. Since two kinds of capacitance change characteristics are used to detect the load, linearity in the capacitance change characteristic (capacitance change characteristic during application of load) is improved. In this embodiment, the second electrode 20 may have one of properties of elasticity and flexibility. For a higher linearity, the second electrode 20 preferably has elasticity such that the first dielectric 31 and the second electrode 20 are elastically deformed when a load is applied to the pressure sensing element 100 as illustrated in FIG. 6C.

In FIG. 6A to FIG. 6C, the protrusion 15 has a truncated pyramidal shape, but may have a cylindrical shape or a semispherical shape. The protrusion 15 preferably has a truncated pyramidal shape or a semispherical shape in order to improve the linearity in the capacitance change characteristics and give the pressure sensing element 100 a longer service life.

Hereinafter, the pressure sensing element 100 of the second embodiment is described in detail. The capacitance of the pressure sensing element 100 is a combination of a first capacitance and a second capacitance, which are different kinds of capacitances. In other words, the pressure sensing element 100 of this embodiment detects each of the first capacitance and the second capacitance for sensing.

Figure 8:
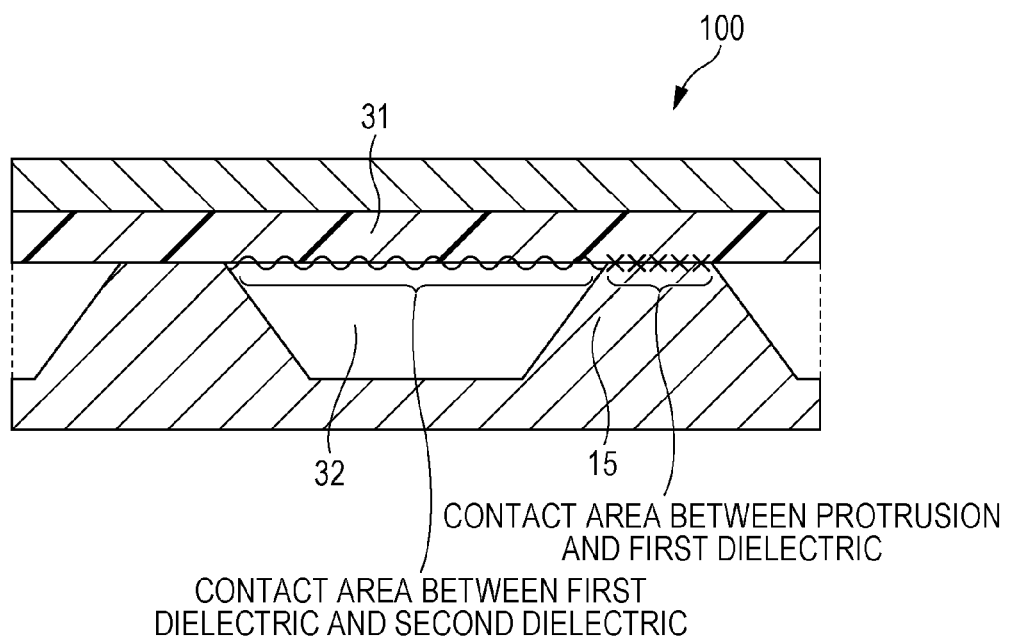
FIG. 8 is a cross-sectional view of the pressure sensing element which indicates a contact area between a protrusion and a first dielectric and a non-contact area between the protrusion and the first dielectric.
Figure 9A:
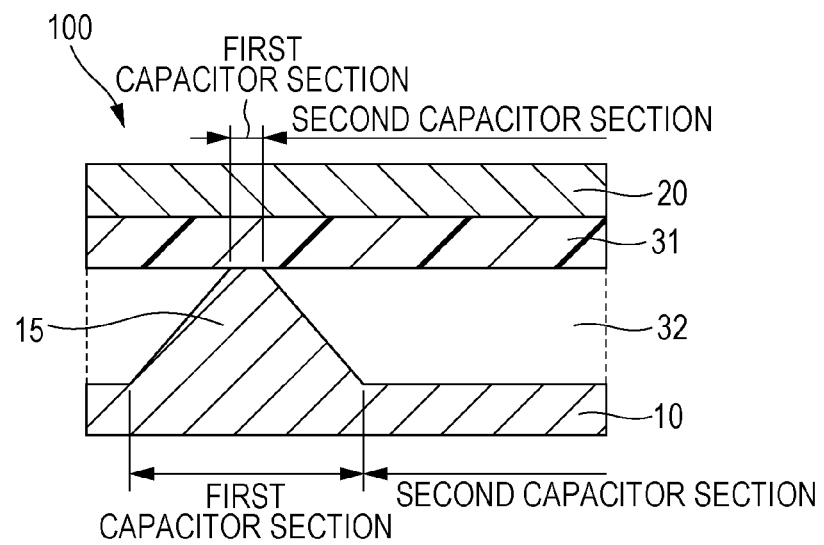
FIG. 9A is a cross-sectional view of the pressure sensing element and indicates an area of the first capacitor and an area of the second capacitor.

As illustrated in FIG. 8 and FIG. 9A, the first capacitance is a capacitance of a first capacitor including a contact area between the protrusion 15 and the first dielectric 31. Specifically, the first capacitance corresponds to the capacitance of the first capacitor including the contact area between the top 15' (top surface, for example) of the protrusion 15 and a main surface of the first dielectric 31 as illustrated in FIG. 8 and FIG. 9A. The second capacitance is a capacitance of the second capacitor including a non-contact area, in which the protrusion 15 and the first dielectric 31 are not in contact with each other. Specifically, the second capacitance corresponds to the capacitance of the second capacitor, which does not include the contact area between the top 15' (top surface, for example) of the protrusion 15 and the main surface of the first dielectric 31, as illustrated in FIG. 8 and FIG. 9A. The second capacitance is the capacitance of the second capacitor including a contact area between the second dielectric 32 and the first dielectric 31 as illustrated in FIG. 8.

The first capacitance and the second capacitance are described in detail. Herein, a capacitance C [pF] of the first capacitor and a load F [N] applied to the pressure sensing element are expressed by the following equations, respectively:

$$C = \frac{\varepsilon S}{d}$$

$$F = E \cdot eS$$

where ∈ [pF/m] represents a dielectric constant of the dielectric, S [m$^2$] represents a contact area between the protrusion and the first dielectric, d [m] represents a thickness of the first dielectric, E [Pa] is Young's modulus, and e represents distortion.

In the embodiment, the first capacitance has a characteristic in which the load increases more readily than the capacitance. As indicated in FIG. 6D, in the first capacitor, an increase rate of the capacitance C decreases as the load applied to the pressure sensing element increases. The capacitance C varies according to one variable parameter, i.e., the area S (contact area between the protrusion 15 and the first dielectric 31). The load F varies according to two variable parameters, i.e., the area S and the distortion e (deformation amount of the first dielectric 31 and the second electrode 20). Thus, the first capacitor has a characteristic in which the load increases more readily than the capacitance during application of the load to the pressure sensing element. As a result, the increase rate of the capacitance C tends to decrease as the applied load F increases. Specifically, as indicated by the graph in FIG. 6D, the increase rate of the capacitance C is relatively high in a low-load application section and the increase rate of the capacitance C is relatively low in a high-load application section.

In the first capacitor, the thickness of the first dielectric 31 decreases due to the penetration of the protrusion 15 to the first dielectric 31. Specifically, a distance d' between the top 15' of the protrusion 15 and the second electrode 20 decreases due to the penetration. The distance d' is one of variable parameters of the capacitance C, but is not a major parameter, because the distance d' has only a little influence compared with the distortion e, which has an influence on the load F.

A capacitance C [pF] of the second capacitor is expressed by the following equation:

$$C = \frac{\varepsilon S}{d}$$

where ∈ [pF/m] represents a dielectric constant of the dielectric, S [m²] represents a contact area between the electrode and the dielectric, and d [m] represents the thickness of the dielectric.

As illustrated in FIG. 7D, in the second capacitor of this embodiment, an increase rate of the capacitance C increases as the load applied to the pressure sensing element 100 increases. The capacitance C of the second capacitor is inversely proportional to the thickness d of the dielectric 30 (particularly, the thickness of the second dielectric 32), which is a variable parameter. This has a large influence, and thus the increase rate of the capacitance C tends to increase as the applied load F increases. Specifically, as indicated by the graph in FIG. 7D, the increase rate of the capacitance C is relatively low in the low-load application section and the increase rate of the capacitance C is relatively high in the high-load application section.

Figure 9B:
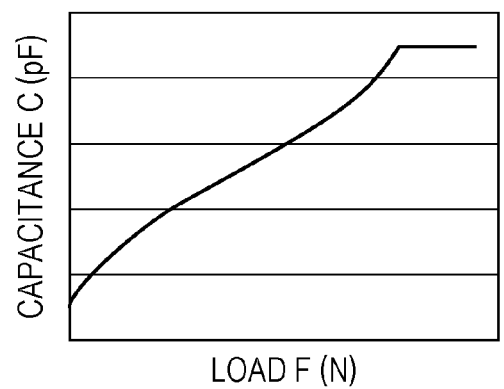
FIG. 9B is a diagram schematically indicating a capacitance change characteristic of the pressure sensing element during application of pressure.

The capacitance of the pressure sensing element 100 of the present disclosure includes the first capacitance and the second capacitance, which have different capacitance characteristics. This enables the pressure sensing element 100 to have a high linearity as indicated in FIG. 9B. Specifically, a ratio of the first capacitance to the second capacitance is adjusted to control sensitivity in the low-load application section and the high-load application section, so that the pressure sensing element 100 has a high linearity. More specifically, the relationship of the correlation between the load and the first capacitance of the first capacitor and the correlation between the load and the second capacitance of the second capacitor is appropriately adjusted to control the sensitivity in the low-load application section and the high-load application section, so that the pressure sensing element 100 has a high linearity. The characteristic of the first capacitor, in which the increase rate of the capacitance C decreases as the applied load F increases, may be stronger than the characteristic of the second capacitor, in which the increase rate of the capacitance C increases as the applied load F increases. In such a case, the capacitance is adjusted to have a lower ratio of the first capacitance to the second capacitance, or conversely, the capacitance is adjusted to have a higher ratio of the second capacitance to the first capacitance. This generally enables the pressure sensing element 100 to have a high linearity. Similarly, the characteristic of the first capacitor, in which the increases rate of the capacitance C decreases as the applied load F increases, may be weaker than the characteristic of the second capacitor, in which the increase rate of the capacitance C increases as the applied load F increases. In such a case, the capacitance is adjusted to have a higher ratio of the first capacitance to the second capacitance, or conversely, the capacitance is adjusted to have a lower ratio of the second capacitance to the first capacitance. This generally enables the pressure sensing element 100 to have a high linearity.

The ratio of the first capacitance to the second capacitance may be adjusted such that the characteristic of the first capacitor (correlation between the load and the first capacitance) becomes stronger than the characteristic of the second capacitor (correlation between the load and the second capacitance). In such a case, the pressure sensing element 100 has high sensitivity in the low-load application section and has low sensitivity in the high-load application section. The ratio of the first capacitance to the second capacitance may also be adjusted such that the characteristic of the second capacitor (correlation between the load and the second capacitance) becomes stronger than the characteristic of the first capacitor (correlation between the load and the first capacitance). In such a case, the pressure sensing element 100 has low sensitivity in the low-load application section and has high sensitivity in the high-load application section.

The graph in FIG. 9B indicates that the capacitance characteristic (correlation between the load and the capacitance) of the pressure sensing element 100 has a high linearity. The capacitance characteristic of the pressure sensing element 100 has a higher linearity than each of the capacitance characteristic (correlation between the load and the first capacitance) of the first capacitor and the capacitance characteristic (correlation between the load and the second capacitance) of the second capacitor. In other words, the pressure sensing element 100 as a whole has a higher linearity in the correlation between the load applied to the pressure sensing element 100 and the capacitance than each of the first capacitor and the second capacitor.

Figure 10:
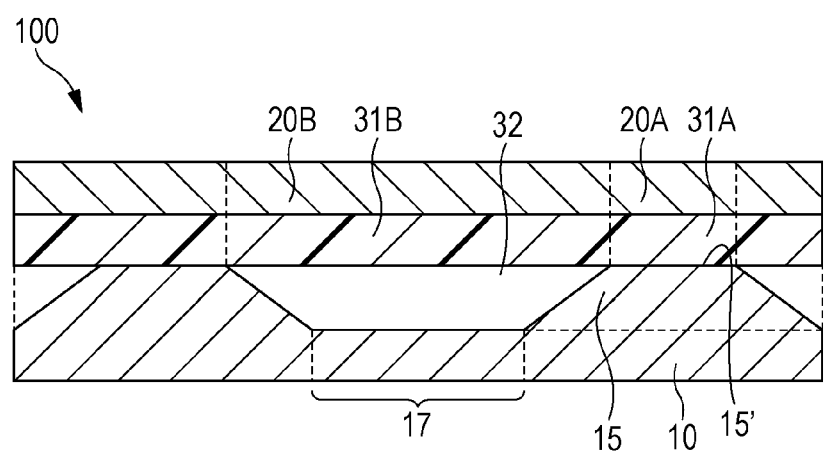
FIG. 10 is a cross-sectional view of the pressure sensing element and indicates components of the first capacitor and the second capacitor.

The first capacitor and the second capacitor are described in detail. The first capacitor includes the protrusion 15. In other words, the first capacitor is a capacitor including the contact surface between the top 15' of the protrusion 15 and the main surface of the first dielectric 31. Specifically, as illustrated in FIG. 10, the first capacitor includes the protrusion 15 of the first electrode 10, a first section 20A of the second electrode 20 facing the protrusion 15, and a first section 31A of the first dielectric 31 positioned between the protrusion 15 and the first section 20A. The second capacitor does not include the protrusions 15. The second capacitor includes a non-contact area, in which the protrusion 15 and the first dielectric 31 are not in contact with each other. In other words, the second capacitor is a capacitor, which does not include the contact area between the top 15' of the protrusion 15 and the main surface of the first dielectric 31. Specifically, as illustrated in FIG. 10, the second capacitor includes the protrusion-free portion 17 of the first electrode 10, which does not include the protrusions 15, a second section 20B of the second electrode 20 facing the protrusion-free portion 17, a second section 31B of the first dielectric 31, and the second dielectric 32. The second section 31B and the second dielectric 32 are positioned between the protrusion-free portion 17 and the second section 20B of the second electrode 20.

Figure 11:
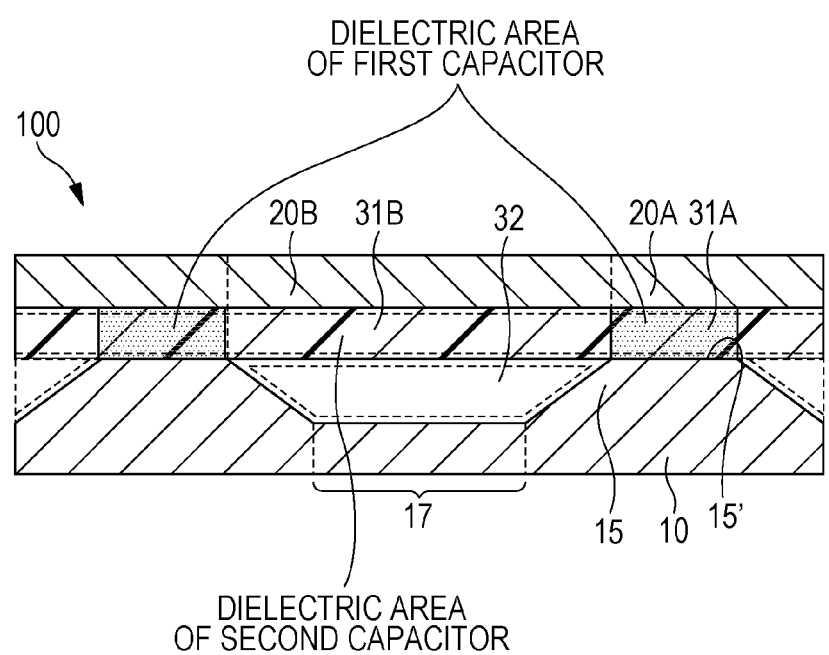
FIG. 11 is a cross-sectional view of the pressure sensing element indicating the dielectric of each of the first capacitor and the second capacitor.

FIG. 11 schematically illustrates a dielectric of each of the first capacitor and the second capacitor. As can be seen from the view, the first capacitor stores an electrical charge in an element area including a portion of the protrusion 15 of the first electrode 10, a portion of the first section 20A of the second electrode 20, and a dielectric between the top 15' and the first section 20A. The second capacitor stores an electrical charge in an element area including a portion of the protrusion-free portion 17 of the first electrode 10, a portion of the second section 20B of the second electrode 20, and a dielectric between the protrusion-free portion 17 and the second section 20B.

The pressure sensing element 100 of this embodiment includes the first capacitor and the second capacitor having different configurations. This enables the pressure sensing element 100 as a whole to have a high linearity in the capacitance change characteristic during application of a load.

In the embodiment, the high linearity of the pressure sensing element is obtained through detection of two kinds of the capacitance for sensing. Specifically, the pressure sensing element obtains the high linearity through detection of the total capacitance including the capacitance between the protrusion of the first electrode (protrusion 15) and the second electrode and the capacitance at the deformable dielectric (second dielectric 32) for sensing.

The detection of the change in capacitance may be operated in either of a self-capacitance mode and a mutual capacitance mode. Alternatively, any other known mode may be employed to detect the change in capacitance. Any proper mode may be employed according to usage of the pressure sensing element 100. In addition, any known method may be employed to derive the load from the change in the capacitance of the pressure sensing element 100.

The pressure sensing element 100 may be used together with a controller. The controller may be configured to store data relating to the changes in the capacitance of the pressure sensing element 100 or store data relating to a distribution of the derived load. Alternatively, the controller may be configured to output such changes or a distribution of the derived load. The controller may be disposed separately from the pressure sensing element 100, and the pressure sensing element 100 may be controlled by an external arithmetic processing unit such as a personal computer (PC).

Other Components

Figure 12:
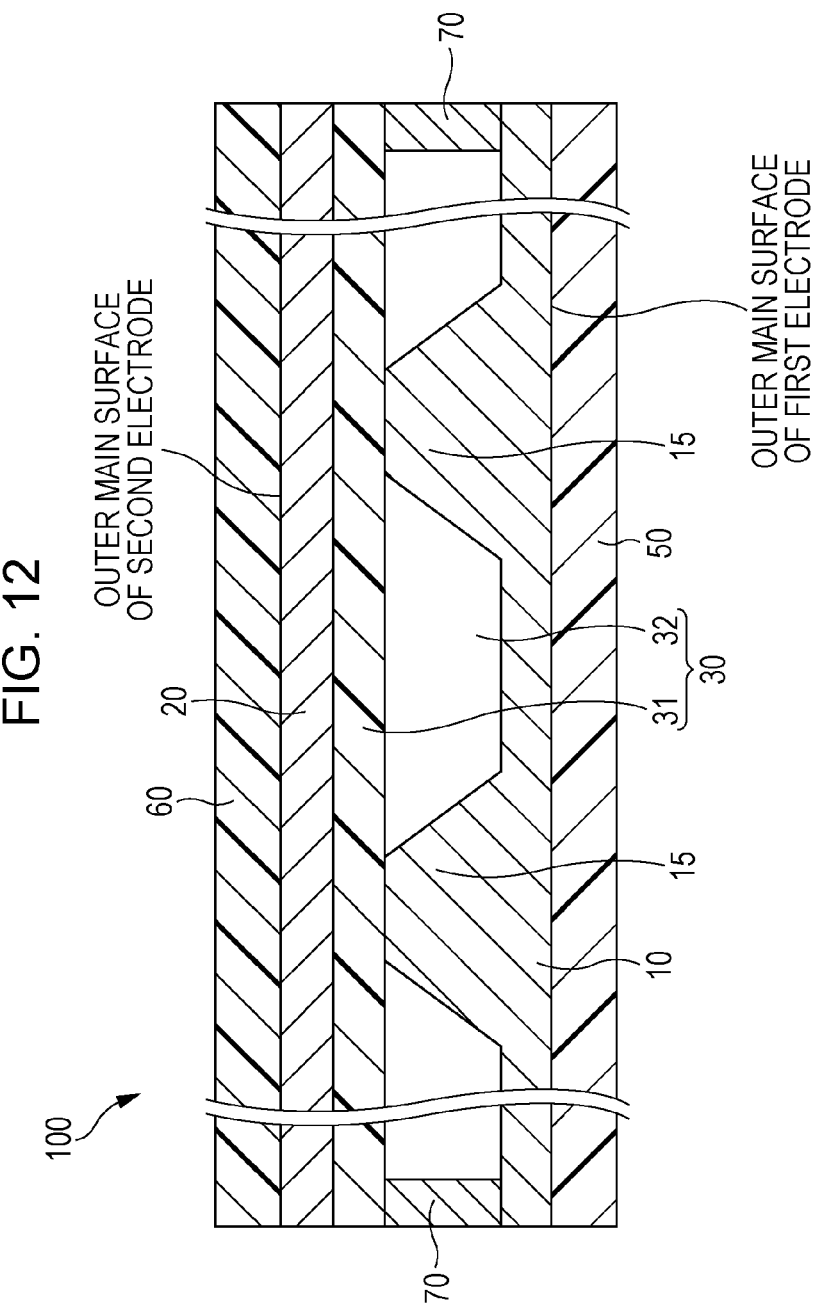
FIG. 12 is a cross-sectional view schematically illustrating a pressure sensing element further including a supporting member, a pressing member, and a spacer.

As illustrated in FIG. 12, the pressure sensing element 100 according to another aspect of the present disclosure further includes a supporting member 50 and a pressing member 60. As illustrated, the supporting member 50 and the pressing member 60 are disposed on respective sides of a structure including the first electrode 10, the second electrode 20, and the dielectric 30.

As illustrated in FIG. 12, the supporting member 50 is in contact with an outer main surface of the first electrode 10. The supporting member 50 at least supports the structure including the first electrode 10, the second electrode 20, and the dielectric 30. The supporting member 50 may have flexibility. The supporting member 50 may be a resin board and may include at least one resin component selected from the group consisting of polyethylene terephthalate, polycarbonate, and polyimide, for example.

As illustrated in FIG. 12, the pressing member 60 is in contact with the outer main surface of the second electrode 20. The pressing member 60 directly receives the pressure to be applied to the structure including the first electrode 10, the second electrode 20, and the dielectric 30. The pressing member 60 may have flexibility. The pressing member 60 may be a resin board and may include at least one resin component selected from the group consisting of polyethylene terephthalate, polycarbonate, and polyimide, for example.

The pressure sensing element 100 of the present disclosure may further include a spacer 70. Specifically, as illustrated in FIG. 12, the spacer 70 may be disposed between the first electrode 10 and the second electrode 20 facing each other. As illustrated, the spacer 70 may be disposed on a peripheral portion of each of the first electrode 10 and the second electrode 20. The spacer 70 enables the first electrode 10 to face the second electrode 20. In addition, the spacer 70 allows the first dielectric 31 to deform and return to its original shape and allows the second dielectric 32 to deform so as to become thinner and return to its original shape when the pressure is applied to the pressure sensing element 100. The spacer 70 may include an insulating resin such as a polyester resin, an epoxy resin, or a combination thereof. Alternatively, the protrusion 15 of the first electrode 10 may be used as a spacer.

Embodiment of Light Transmissive Pressure Sensing Element

The pressure sensing element 100 according to this embodiment is a transparent pressure sensing element. In this embodiment, at least one of the first electrode 10, the second electrode 20, the first dielectric 31, and the second dielectric 32 has light transmissivity. In other words, at least one of the components of the pressure sensing element 100 is transparent in a visible light range.

All of the components of the pressure sensing element 100 may be transparent. Each of the first electrode 10, the second electrode 20, the first dielectric 31, and the second dielectric 32 may have light transmissivity. In addition, the supporting member 50 and the pressing member 60 may also have light transmissivity.

The above-described components of the pressure sensing element 100 include the following material, for example, to have transparency. The supporting member 50 and the pressing member 60 may include a transparent resin material such as polyethylene terephthalate, polycarbonate, or a combination thereof, for example.

The first electrode 10 includes a resin body and a conductive filler dispersed in the resin body in some cases. In such cases, the resin body may include at least one highly transparent resin material selected from the group consisting of a silicone resin, a styrene resin, an acrylic resin such as polymethyl methacrylate, and a rotaxane resin. The conductive filler may be formed of nanoparticles including indium (III) oxide ($In_2O_3$), zinc oxide (ZnO), tin (IV) oxide ($SnO_2$), or a combination of indium (III) oxide and tin (IV) oxide, or a combination of zinc oxide and tin (IV) oxide, for example. Alternatively, the conductive filler may be formed of a nanowire formed of gold (Au), silver (Ag), copper (Cu), carbon (C), or any combination thereof, for example. The nanowire may have a diameter of a few tens of nanometers (nm). The first electrode 10 formed of such a resin body and a conductive filler has the transparency. In the first electrode 10, a transparent conductive ink such as indium (III) oxide ($In_2O_3$) may be applied to the surface of the resin body to form a transparent conductive layer instead of the conductive filler. In addition, the resin body may have a conductive grid pattern, which is formed of silver (Ag) or copper (Cu), for example, on the surface. The conductive grid pattern may include lines each having a width of a few hundred nanometers (nm) and may have a pitch of a few tens of micrometers (μm).

The first electrode 10 includes the glass body and the conductive filler dispersed in the glass body in some cases. In such cases, the glass body may include at least one glass material having high transparency selected from the group consisting of be at least one of quartz glass, soda-lime glass, borosilicate glass, and lead glass, for example. The conductive filler may be the same as the conductive filler used in the above-described resin body. The first electrode 10 including such a glass body and a conductive filler has transparency. In the first electrode 10, a transparent conductive ink such as indium (III) oxide (In$_2$O$_3$) may be applied to the surface of the glass body to form a transparent conductive layer instead of the conductive filler. In addition, the glass body may have a conductive grid pattern, which is formed of silver (Ag) or copper (Cu), for example, on the surface. The conductive grid pattern may include lines each having a width of a few hundred nanometers (nm) and may have a pitch of a few tens of micrometers.

The second electrode 20 may be a transparent electrode layer. The second electrode 20 may include a transparent electrode material including indium (III) oxide (In$_2$O$_3$), zinc oxide (ZnO), tin (IV) oxide (SnO$_2$), a combination of indium (III) oxide and tin (IV) oxide, or a combination of zinc oxide and tin (IV) oxide.

The first dielectric 31 may be a transparent dielectric layer. The first dielectric 31 may include a transparent dielectric material such as a polyethylene terephthalate resin, a polyimide resin, or a combination thereof, for example.

The second dielectric 32 may be an air layer. The second dielectric 32 that is the air layer reliably has light transmissivity.

Embodiment of Matrix Sensors

This embodiment includes a plurality of pressure sensing elements 100 as sensor elements in a matrix.

In this embodiment, a change in capacitance of a capacitance detection portion is used to determine a position of load application in a detection surface of a sensor device including the pressure sensing elements 100. Specifically, the sensor device includes a plurality of second electrodes arranged along the detection surface, a plurality of first electrodes facing the second electrodes, and a plurality of capacitance detection portions each defined by the second electrode and the first electrode. In this embodiment, the first electrodes adjacent to each other in a predetermined direction may be electrically connected to each other. The second electrodes may be electrically connected to each other and/or the first electrodes may be electrically connected to each other.

Method of Producing Pressure Sensing Element

Next, a method of producing the pressure sensing element of the present disclosure is described. The pressure sensing element of the present disclosure is produced by a method including:

providing a supporting member (supporting member providing step);

forming a first electrode on the supporting member (first electrode formation step);

forming a second electrode on a pressing member (second electrode formation step);

forming a first dielectric on the second electrode (first dielectric formation step); and disposing the pressing member, on which the second electrode and the first dielectric are disposed, on the supporting member, on which the first electrode is formed, such that the first dielectric directly faces the first electrode, thereby forming a second dielectric at a position between the first dielectric and the first electrode (pressing member mounting step).

The method of producing the pressure sensing element 100 of the present disclosure is described in detail with reference to FIG. 13A to FIG. 13F. FIG. 13A to FIG. 13F indicate an outline of steps in the method of producing the pressure sensing element 100 according to one of embodiments.

Supporting Member Providing Step

Figure 13A:
FIG. 13A is a cross-sectional view schematically illustrating a step of providing a supporting member in a method of producing the pressure sensing element of the present disclosure.

As illustrated in FIG. 13A, the supporting member 50 is provided. The supporting member 50 may be a flexible board. The supporting member 50 may be a plastic board including polyethylene terephthalate, polycarbonate, polyimide, or any combination thereof, for example.

First Electrode Formation Step

Then, a composite material including a liquid polymer resin material and a conductive filler is applied to the supporting member 50. The liquid polymer resin material may be a urethane resin, a silicone resin, a styrene resin, an acrylic resin, a rotaxane resin, or any combination thereof, for example. The conductive filler may be at least one material selected from the group consisting of gold (Au), silver (Ag), copper (Cu), carbon (C), zinc oxide (ZnO), indium (III) oxide (In$_2$O$_3$), and tin (IV) oxide (SnO$_2$), for example.

Figure 13B:
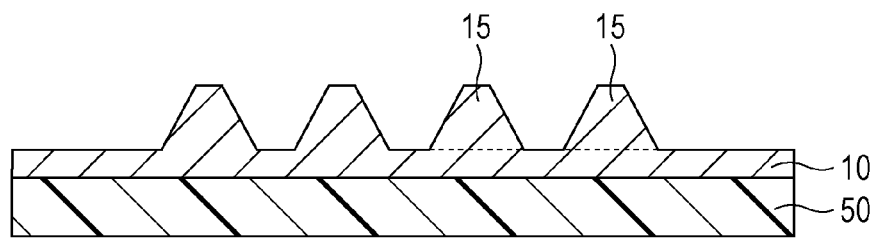
FIG. 13B is a cross-sectional view schematically illustrating a step of forming a first electrode in the method of producing the pressure sensing element.

Then, a mold having a concave-convex pattern is pressed against the composite material layer on the supporting member 50. Then, the composite material layer is cured. As a result, the first electrode 10 having the protrusions 15 is formed (FIG. 13B). Specifically, the concave-convex pattern of the mold is transferred to the composite material layer, so that a plurality of pillar-like protrusions (protrusions 15) are formed. The pillar-like protrusions may have any shape (such as a cylindrical shape, a conical shape, a circular truncated conical shape, a four-sided truncated pyramidal shape, a semispherical shape, or a lattice shape) in accordance with the shape of the concave-convex pattern of the mold.

The first electrode 10 may be formed without the composite material including the conductive filler. A liquid polymer resin material may be applied to the supporting member 50 to form a resin material layer. The concave-convex pattern is transferred to the resin material layer to form a resin body. Then, an ink including a conductive filler may be applied to the surface of the resin body to form a conductive layer, for example.

Such a method of forming the first electrode 10 employs a nanoimprint technology. Specifically, the mold having a concave-convex pattern is pressed against the resin body, which is a transfer target, such that a nano-sized pattern of a mold is transferred to the resin body. Such a technology is able to reliably form a fine pattern and a three-dimensional shape having a tapered side such as a conical shape, compared with lithography. The nanoimprint technology is able to readily control the overall shape of the first electrode 10 and the height of the protrusion by using the mold having a predetermined concave-convex pattern. The nanoimprint technology is also able to control the shape of the protrusion. The change in the contact area between the protrusion 15 and the first dielectric layer 31 in the pressure sensing element 100 (change in the contact area during application of pressure) is allowed to be gentle by controlling the shape of the protrusion. The change in capacitance during application of pressure is able to be appropriately controlled, and thus the pressure sensing element 100 that detects the pressure with high accuracy is obtained.

The first electrode 10 may be formed by a technology other than the nanoimprint technology such as a photolitho-etching technology or a developing and removing technology. In photolitho-etching, a desired height and a desired shape of the protrusion 15 are obtained through control of the concentration and flow rate of an etching liquid.

The first electrode 10 may be formed without the resin material. The metal body may be used as the first electrode 10, for example. In such a case, the first electrode 10 may be patterned by roughening of a metal foil, micro blasting, deposition, or sputtering to form protrusions having a predetermined height and a shape. The first electrode 10 may have protrusions 15 formed of different metals. The glass body may be used as the first electrode 10, for example. In such a case, blasting, machining, grinding, or chemical etching may be performed.

Spacer Formation Step

Figure 13C:
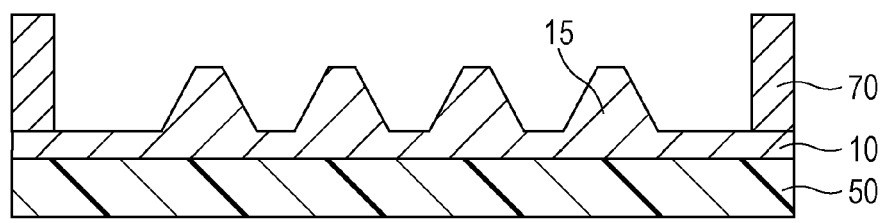
FIG. 13C is a cross-sectional view schematically illustrating a step of forming a spacer in the method of producing the pressure sensing element.

Then, as illustrated in FIG. 13C, the spacer 70 is formed. As illustrated, the spacer 70 may be positioned on a periphery of an assembly including the supporting member 50 and the first electrode 10. The spacer 70 may be formed of an insulating resin material such as a polyester resin, an epoxy resin, or a combination thereof, for example. Alternatively, the protrusion 15 of the first electrode 10 may be used as a spacer.

Second Electrode Formation Step

Figure 13D:
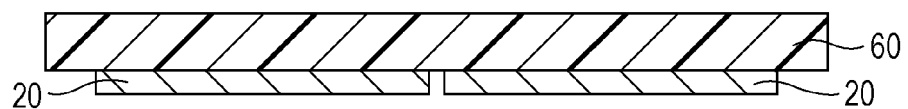
FIG. 13D is a cross-sectional view schematically illustrating a step of forming a second electrode in the method of producing the pressure sensing element.

Then, as illustrated in FIG. 13D, a plurality of second electrodes 20 are formed on the pressing member 60. Specifically, the second electrodes 20 are separated from each other on a flexible plastic board formed of a resin material, which is used as the pressing member 60. The resin material of the pressing member 60 may be polyethylene terephthalate, polycarbonate, polyimide, or any combination thereof, for example.

The method of forming the second electrode 20 is not limited. A composite material including a liquid polymer resin material including a conductive filler therein may be printed in a pattern on the pressing member 60 and cured to form the second electrode 20. The polymer resin material may be a silicone resin, a styrene resin, an acrylic resin, a rotaxane resin, or any combination thereof, for example. The conductive filler may be at least one material selected from the group consisting of gold (Au), silver (Ag), copper (Cu), carbon (C), zinc oxide (ZnO), indium (III) oxide ($In_2O_3$), and tin (IV) oxide ($SnO_2$), for example. Alternatively, the second electrode 20 may be formed by an electroless plating process or a sol-gel process.

First Dielectric Formation Step

Figure 13E:
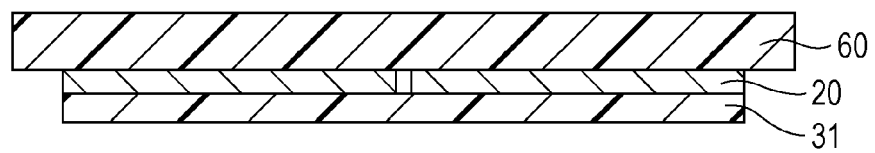
FIG. 13E is a cross-sectional view schematically illustrating a step of forming a first dielectric in the method of producing the pressure sensing element.

Then, as illustrated in FIG. 13E, the first dielectric 31 is formed. Specifically, the first dielectric 31 is formed on the second electrodes 20. A resin material is applied to surfaces of the second electrodes 20 to form the first dielectric 31, for example. The resin material of the first dielectric 31 may include at least one material selected from the group consisting of a polypropylene resin, a polyethylene terephthalate resin, a polyimide resin, a polyphenylene sulfide resin, aluminum oxide ($Al_2O_3$), and tantalum pentoxide ($Ta_2O_5$), for example.

Pressing Member Disposing Step

Figure 13F:
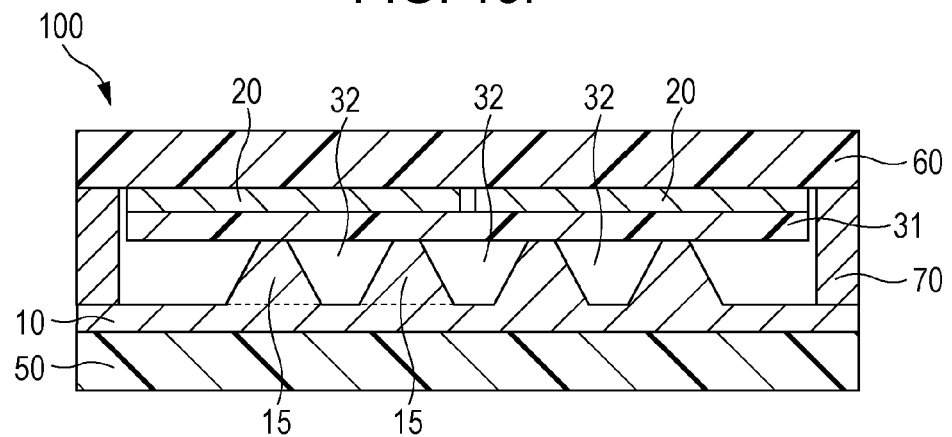
FIG. 13F is a cross-sectional view schematically illustrating a step of disposing a pressing member in the method of producing the pressure sensing element.

Then, the pressing member 60 is disposed on the assembly including the supporting member 50 and the first electrode 10. Specifically, as illustrated in FIG. 13F, the pressing member 60 having the second electrodes 20 and the first dielectric 31 thereon is disposed on the assembly including the supporting member 50 and the first electrode 10 with the spacer 70 being disposed therebetween. Particularly, the pressing member 60 is disposed such that the first dielectric 31 directly faces the first electrode 10. A space defined by the first dielectric 31 and the first electrode 10 is the second dielectric 32.

The pressure sensing element 100 as illustrated in FIG. 13F is obtained by the above steps.

The embodiments of the present disclosure have been described above. However, the present disclosure is not limited to the above description. As is readily appreciated by a person skilled in the art, various modification may be applied to the above-described embodiments.

What is claimed is:

1. A pressure sensing element comprising:
a first electrode including at least one protrusion;
a second electrode facing the at least one protrusion; and
a dielectric disposed between the first electrode and the second electrode, the dielectric including a first dielectric and a second dielectric, wherein
the first dielectric is disposed between a top of the at least one protrusion and the second electrode, and is in contact with each of the top of the at least one protrusion and the second electrode,
the second dielectric is disposed between a protrusion-free portion of the first electrode and the first dielectric, the protrusion-free portion not including the at least one protrusion,
the at least one protrusion has a higher elastic modulus than the first dielectric,
the pressure sensing element has a capacitance including a first capacitance and a second capacitance,
the first capacitance is a capacitance of a first capacitor including a contact area between the at least one protrusion and the first dielectric, and
the second capacitance is a capacitance of a second capacitor including a contact area between the first dielectric and the second dielectric.

2. The pressure sensing element according to claim 1, wherein the first dielectric has flexibility.

3. The pressure sensing element according to claim 1, wherein the second dielectric is configured such that a thickness of the second dielectric decreases when the first dielectric is flexurally deformed by a load applied to the pressure sensing element.

4. The pressure sensing element according to claim 1, wherein the first dielectric has elasticity.

5. The pressure sensing element according to claim 1, wherein a capacitance characteristic of the pressure sensing element has a higher linearity than that of the first capacitance and that of the second capacitance.

6. The pressure sensing element according to claim 1, wherein the first capacitor includes the at least one protrusion, a first section of the second electrode facing the at least one protrusion, and a part of the first dielectric positioned between the at least one protrusion and the first section of the second electrode, and
the second capacitor includes the protrusion-free portion of the first electrode, a second section of the second electrode facing the protrusion-free portion of the first electrode, a part of the first dielectric positioned between the protrusion-free portion of the first electrode and the second section of the second electrode, and the second dielectric.

7. The pressure sensing element according to claim 1, wherein the at least one protrusion has a tapered shape in which a width of the at least one protrusion gradually decreases toward the second electrode.

8. The pressure sensing element according to claim 1, wherein at least one selected from the group of the first electrode, the second electrode, the first dielectric, and the second dielectric has light transmissivity.

9. The pressure sensing element according to claim 1, further comprising a supporting member and a pressing member, wherein
the first electrode has a first main surface facing the second electrode and a second main surface opposite the first main surface, the second electrode has a third main surface facing the first electrode and a fourth main surface opposite the third main surface, the supporting member is in contact with the second main surface, and the pressing member is in contact with the fourth main surface.

10. The pressure sensing element according to claim 1, further comprising a spacer disposed between the first electrode and the second electrode.

11. The pressure sensing element according to claim 1, wherein the first dielectric is configured to allow at least one portion of the at least one protrusion to penetrate into the first dielectric and configured to such that a contact area between the at least one protrusion and the first dielectric increases due to the penetration when a load is applied to the pressure sensing element.

12. The pressure sensing element according to claim 11, wherein the second dielectric is configured such that a thickness of the second dielectric decreases when the at least one portion of the at least one protrusion penetrates into the first dielectric by the application of the load to the pressure sensing element.

* * * * *